US012704735B2

(12) United States Patent
Muendel et al.

(10) Patent No.: US 12,704,735 B2
(45) Date of Patent: Aug. 11, 2026

(54) BEAM CONTROL FOR OPTICAL BEAMS

(71) Applicant: Lumentum Operations LLC, San Jose, CA (US)

(72) Inventors: Martin H. Muendel, Oakland, CA (US); Richard D. Faulhaber, San Carlos, CA (US)

(73) Assignee: Lumentum Operations LLC, San Jose, CA (US)

( * ) Notice: Subject to any disclaimer, the term of this patent is extended or adjusted under 35 U.S.C. 154(b) by 298 days.

(21) Appl. No.: 18/478,620

(22) Filed: Sep. 29, 2023

(65) Prior Publication Data

US 2025/0004288 A1 Jan. 2, 2025

Related U.S. Application Data

(60) Provisional application No. 63/511,475, filed on Jun. 30, 2023.

(51) Int. Cl.

*G02B 27/09* (2006.01)
*G02B 6/34* (2006.01)
*G02B 26/08* (2006.01)
*G02B 27/30* (2006.01)

(52) U.S. Cl.

CPC ........... *G02B 27/0972* (2013.01); *G02B 6/34* (2013.01); *G02B 26/0883* (2013.01); *G02B 27/0955* (2013.01); *G02B 27/30* (2013.01)

(58) Field of Classification Search

CPC ................ G02B 27/09; G02B 27/0972; G02B 27/0955; G02B 27/0927; G02B 27/281; G02B 27/283; G02B 27/12; G02B 27/126; G02B 27/30; G02B 6/42; G02B 6/34; G02B 6/4206; G02B 26/08; G02B 26/0883; G02B 26/0891; B23K 26/064; B23K 26/0648; B23K 26/0626; B23K 26/0652

USPC ....... 359/831, 800, 834, 837, 719, 669, 678, 359/618, 619, 640, 641, 211, 496

See application file for complete search history.

(56) References Cited

U.S. PATENT DOCUMENTS

| | | | | |
|---|---|---|---|---|
| 4,127,828 | A * | 11/1978 | Klauminzer | H01S 3/08009 372/100 |
| 4,811,328 | A * | 3/1989 | Ito | G11B 7/1395 369/112.28 |
| 5,513,201 | A * | 4/1996 | Yamaguchi | G02B 27/0972 372/75 |
| 2002/0085276 | A1* | 7/2002 | Tanitsu | G03F 7/70066 362/337 |
| 2018/0173000 | A1* | 6/2018 | Rothberg | G02B 7/005 |
| 2023/0030757 | A1* | 2/2023 | Hsieh | G02B 27/283 |

* cited by examiner

*Primary Examiner* — Jie Lei
(74) *Attorney, Agent, or Firm* — Harrity & Harrity, LLP

(57) ABSTRACT

In some implementations, an optical device may include a first optical element, wherein the first optical element is a first prism. The optical device may include a second optical element, wherein the second optical element is a second prism, and wherein the optical device is configured to receive a beam and output the beam. The first optical element and the second optical element may be configured to alter a beam shape of the beam, such that the beam has a first shape at a first location and a second shape at a second location.

20 Claims, 4 Drawing Sheets

BEAM CONTROL FOR OPTICAL BEAMS

CROSS-REFERENCE TO RELATED APPLICATION

This Patent Application claims priority to U.S. Provisional Patent Application No. 63/511,475, filed on Jun. 30, 2023, and entitled "PRISM FOR OPTICAL COMPONENT COUPLING." The disclosure of the prior Application is considered part of and is incorporated by reference into this Patent Application.

TECHNICAL FIELD

The present disclosure relates generally to an optical device and to an optical device to control optical beams.

BACKGROUND

A beam profile of an optical beam has a significant impact on system performance of a system using the beam. For example, an optical beam with an annular beam profile or an annulus beam can enable superior cutting performance for a manufacturing system. However, beam profiles of most fiber-delivered optical beams are relatively simplistic. For example, a beam profile may be a Gaussian or near-Gaussian profile for a low-beam-parameter-product (BPP) laser (e.g., a BPP of less than or equal to approximately 3 millimeters times milliradians (mm-mrad)) that can be used for processing thin sheet metal (e.g., sheet metal with a thickness of less than or equal to approximately 3 mm) using a tightly focused optical beam. As another example, the beam profile may be a top-hat (sometimes referred to as a flat-top) profile for a high BPP laser (e.g., a BPP of greater than approximately 3 mm-mrad) that can be used for processing thick sheet metal (e.g., sheet metal with a thickness greater than approximately 3 mm) using a larger beam.

SUMMARY

In some implementations, an optical device includes a first optical element, wherein the first optical element is a first prism; and a second optical element, wherein the second optical element is a second prism, wherein the optical device is configured to receive a beam and output the beam, the first optical element and the second optical element being configured to alter a beam shape of the beam, such that the beam has a first shape at a first location and a second shape at a second location.

In some implementations, an optical system includes a collimating lens to collimate a beam; a focusing lens to focus the beam; and an optical device to shape the beam, the optical device being disposed between the collimating lens and the focusing lens, the optical device comprising: a first pyramidal prism, and a second pyramidal prism, the first pyramidal prism and the second pyramidal prism being positioned to cause the beam to have a first beam shape in a near-field and a second beam shape in a far-field.

In some implementations, a method includes setting, by a controller, a relative position of a first optical element and a second optical element within an optical device within an optical system to a first relative position, wherein the first optical element and the second optical element are a pair of pyramidal prisms, wherein the optical system outputs a beam with a first beam shape with the relative position set to the first relative position; and adjusting, by the controller, the relative position of the first optical element and the second optical element within the optical device within the optical system to a second relative position, wherein the optical system outputs the beam with a second beam shape with the relative position set to the second relative position.

DETAILED DESCRIPTION

Figure 1A:
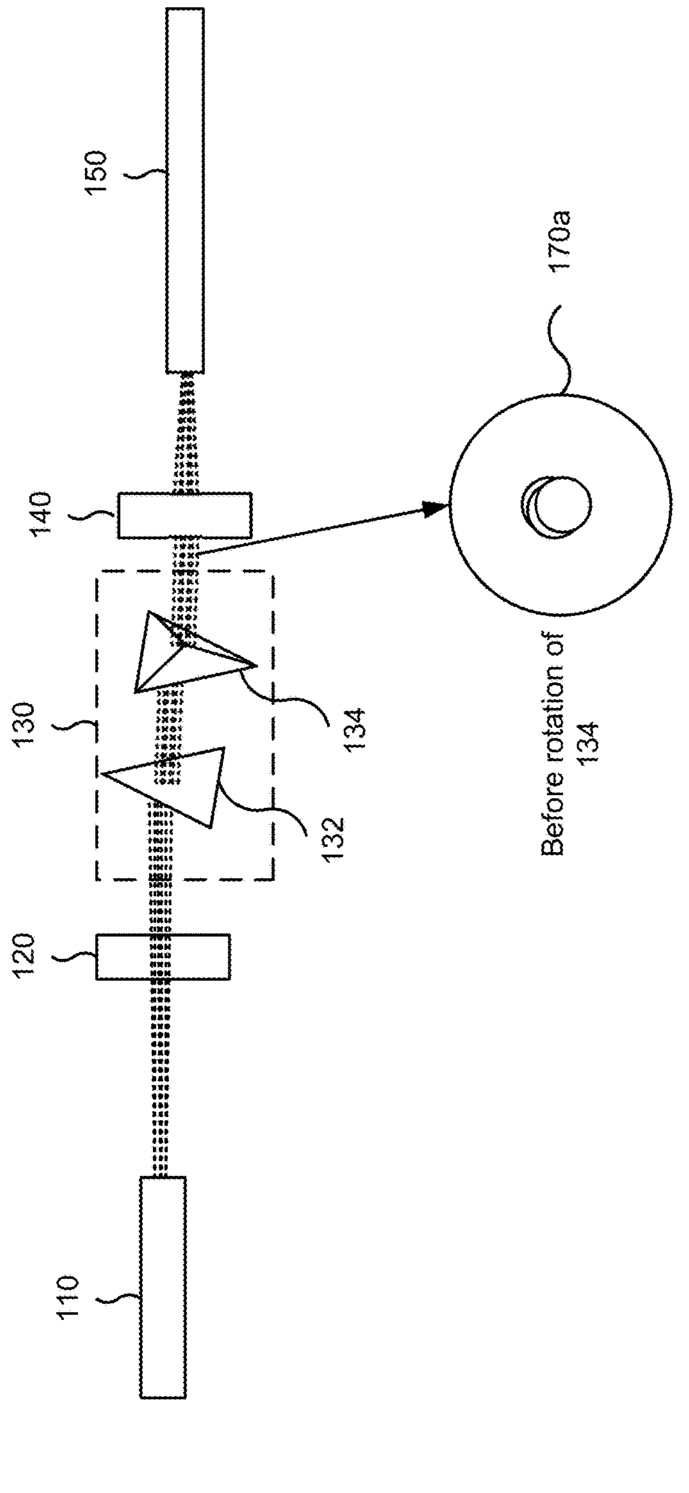
FIGS. 1A-1B are diagrams of an example implementation associated with beam control for optical beams.

The following detailed description of example implementations refers to the accompanying drawings. The same reference numbers in different drawings may identify the same or similar elements.

An optical system may include optical devices, such as optical emitters, process cables, optical elements (e.g., lenses, filters, or mirrors, among other examples), to emit a beam with a particular set of optical characteristics. Examples of such optical systems may include communication systems, measurement systems, sensing systems, manufacturing systems, range-finding systems, or three-dimensional (3D) gesture detection systems, among other examples. Different types of optical systems or use cases for optical systems may be associated with different desired optical characteristics. For example, for an optical communications system, it may be desirable to have a beam that can maintain a center wavelength with a high degree of accuracy and can be modulated to convey information at a high throughput rate. As another example, for an optical manufacturing system, it may be desirable to have a beam that can maintain a consistent energy level, have a particular beam shape, and/or be energy efficient.

Different optical elements can be used to achieve different optical characteristics. For example, an optical coupler, which may include a lens, may be disposed between an optical emitter and a process cable to shape a beam that is to be output from the process cable. In other words, an optical emitter may emit a beam toward an optical coupler. The optical coupler may direct the beam to an input of a process cable, though which the beam may propagate to an output of the process cable. The output of the process cable may direct the beam toward a target, such as, in a manufacturing context, an object that is to be cut, etched, brazed, clad, hardened, or welded, among other examples.

In such a configuration, in some techniques, a beam profile can be varied based at least in part on whether a beam is directed toward the process cable on-axis (e.g., toward a center of the process cable with less than a threshold angle, resulting in fewer than a threshold quantity of reflections within the process cable) or off-axis (e.g., toward an edge of the process cable with greater than a threshold angle, resulting in equal to or more than the threshold quantity of reflections within the process cable). In the former case, the beam may have a spot profile at an input to the process cable and a spot profile at an output from the process cable, which may be desirable for cutting relatively thin metal. In the latter case, the beam may have a spot profile at an input to the process cable and a ring profile at an output of the process cable, which may be desirable for cutting relatively thick metal.

A pedestal optical can be introduced in the optical coupler (e.g., between the optical emitter and the lens of the optical coupler) to alter the beam profile. The pedestal optic may receive a portion of the beam output from the optical emitter and direct the portion of the beam off-axis (e.g., while a remainder of the beam remains on-axis). Accordingly, the process cable receives both an on-axis portion of the beam and an off-axis portion of the beam, resulting in the process cable outputting both a spot profile portion of the beam and a ring profile portion of the beam. By controlling how much of the beam is split off by the pedestal optic, the spot profile portion of the beam can be made greater than the ring profile portion of the beam, resulting in a pedestal profile (e.g., a profile that includes a ring portion with a spot at the center of the ring portion, rather than a void at the center of the ring portion as occurs with a pure ring profile). In other words, by tuning the pedestal optic, the shape of the pedestal can be adjusted (e.g., relative amounts of optical energy in the ring portion and the spot portion of the beam can be changed). This may be desirable for some use cases. However, for other use cases, another type of beam profile may be desirable, such as a vortex beam profile, which has an annulus beam shape along an entire beam profile and which produces extremely sharp beam edges, thereby enabling precise control of the beam.

Figure 1B:
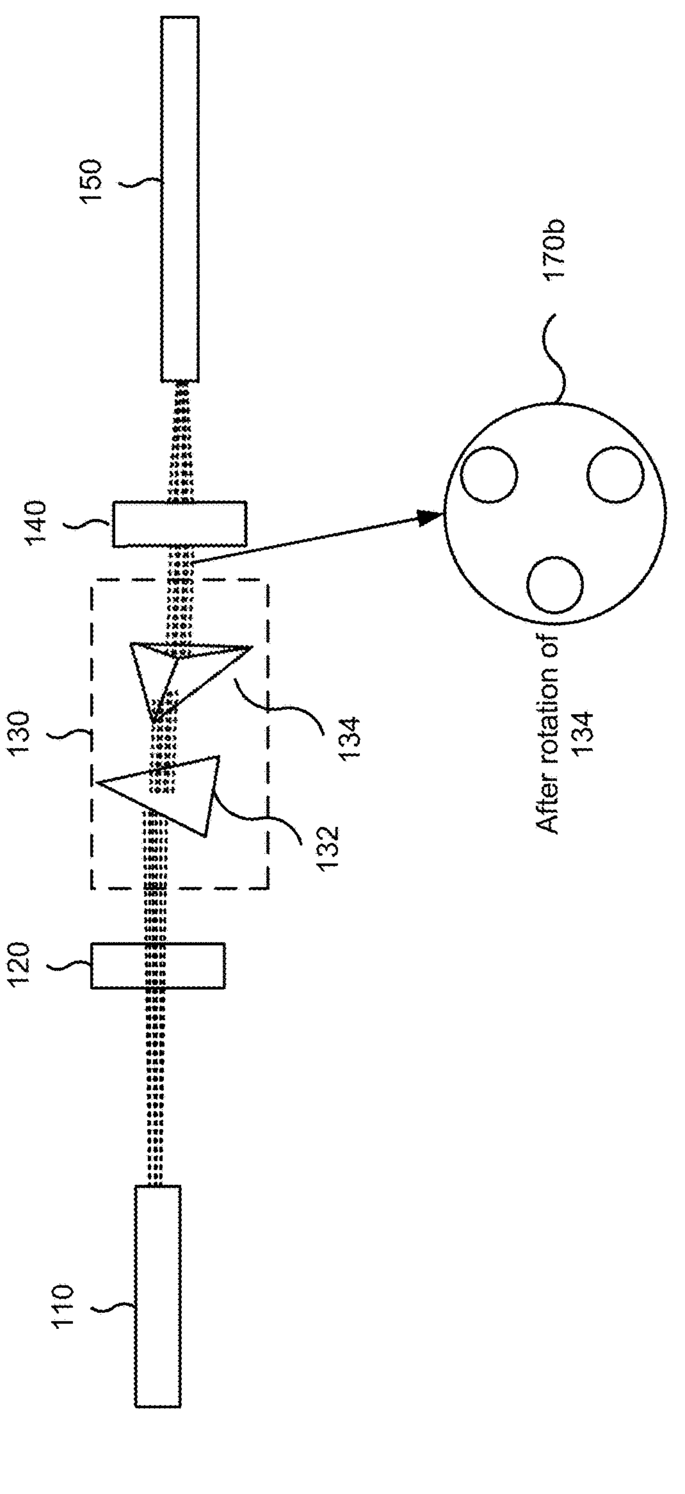

FIGS. 1A-1B are diagrams of an example implementation 100 associated with beam control for optical beams. As shown in FIGS. 1A-1B, example implementation 100 includes an optical emitter 110, a collimating lens 120, an optical shaper 130, a focusing lens 140, and a process cable 150.

The optical emitter 110 may include a vertical cavity surface emitting laser (VCSEL). For example, the optical emitter 110 may be configured to output a beam with a particular beam profile toward the collimating lens 120. In some implementations, the optical emitter 110 may be configured for a beam with a power greater than a threshold amount. For example, the optical emitter 110 may have an optical power of greater than 1 kilowatt (kW), greater than 3 kW, greater than 5 kW, greater than 10 KW, or higher. The collimating lens 120 may collimate the beam and direct the beam to the optical shaper 130. The optical shaper 130 may shape the beam and direct the beam to the focusing lens 140, which may direct the beam to the process cable 150. In other examples, other sets of optical components may be aligned to the optical shaper. For example, the optical shaper 130 may be aligned directly to the optical emitter 110 (e.g., without the collimating lens 120) and/or directly to the process cable 150 (e.g., without the focusing lens 140). Additionally, or alternatively, additional optical components may be included in a beam path, such as an optical filter being disposed between, for example, the optical emitter 110 and the collimating lens 120. Additionally, or alternatively, the optical shaper 130 may be aligned to a different set of components. For example, rather than coupling an optical emitter 110 to a process cable 150, the optical shaper 130 may couple a first process cable to a second process cable. In some implementations, the optical shaper 130 and one or more other optical components (e.g., the collimating lens 120 or the focusing lens 140, among other examples) may be packaged together as an optical coupler. In other words, some optical systems may include an optical emitter 110, an optical coupler, and a process cable 150, among other optical components, and the optical coupler may include a set of optical components, such as the collimating lens 120, the optical shaper 130, or the focusing lens 140, among other examples.

In some implementations, the optical shaper 130 may include a set of optical elements. For example, the optical shaper may include a first optical element 132 and a second optical element 134. In this case, at least one of the first optical element 132 or the second optical element 134 may be movable with respect to the other to enable shaping of a beam. For example, in FIG. 1A, before rotation of optical element 134, a first beam shape 170*a* is achieved in a near field. In contrast, in FIG. 1B, after rotation of the optical element 134, a second beam shape 170*b* is achieved in the near field. As described in more detail herein, moving the optical element 132 or 134 may result in changes to the beam shape in the far field.

In some implementations, the optical elements 132/134 may be a particular type of optical element. For example, the optical elements 132/134 may be a set of prisms. In some implementations, the optical elements 132/134 may be configured with a particular type of material. For example, the optical elements 132/134 may include a glass material, a fused silica material (e.g., infrared grade fused silica), a sulfide material, a crystal material (e.g., a yttrium aluminum garnet (YAG) material, such as undoped YAG), or a sapphire material, among other examples. In some implementations, the optical elements 132/134 (or another optical component, described herein) may have one or more functional layers deposited on one or more surfaces. For example, a surface of the optical elements 132/134 may include an anti-reflection (AR) coating, a dichroic coating, which may reduce or eliminate stimulated Ramen scattering (SRS).

In some implementations, the optical elements 132/134 may have a particular shape. For example, the optical elements 132/134 may be pyramidal prisms with three facets and a base (e.g., 4-sided pyramids), as shown. By using pyramidal prisms with three facets, the optical shaper 130 can maintain a shape of a field of the beam when the beam is recombined, as described in more detail herein (e.g., as a hexagonal close-pack shape). Other quantities of optical elements, types of optical elements, or shapes optical elements are contemplated. For example, a set of two faceted optical elements can manipulate the beam and may change a shape of a field of the beam when the beam is recombined (e.g., as two back-to-back semi-circles).

In some implementations, the optical elements 132/134 may shape a beam that is directed through the optical shaper 130. For example, the three facets of the first optical element 132 may divide the beam into three portions having three different directions. The three portions of the beam may propagate from the base of the optical element 132 in the three different directions toward the base of the optical element 134. The three portions of the beam may propagate through the optical element 134 toward the three facets of the optical element 134. The three facets of the optical element 134 may re-direct the three portions of the beam in a single direction as a single beam toward the focusing lens 140. In other words, the beam enters the optical element 132 as a collimated beam (e.g., with a hexagonal close pack field shape), travels from the optical element 132 to the optical element 134 as a non-collimated beam, and exits the optical element 134 as a collimated beam (e.g., with the hexagonal close pack field shape maintained).

In some implementations, a separation between the optical elements 132/134 may be associated with a geometry of the optical elements 132/134. For example, optical elements 132/134 with a flattened pyramidal shape may have a greater separation that optical elements 132/134 with an angular (e.g., less flattened or steep-sided) pyramidal shape. In some implementations, a rotational difference between the optical elements 132/134 is associated with an optical characteristic of an output beam (e.g., from the optical shaper 130 and/or from the process cable 150). For example, the optical elements 132/134 may be 180 degree rotated from each other, as shown, to maintain a hexagonal close-packed arrangement of a field of the beam and to maintain a brightness of the beam.

In some implementations, a relative position of the optical elements 132/134 may be changed to alter a characteristic of the beam (e.g., in a far field, while maintaining the beam in a near field). For example, the optical element 134 may be translated or rotated relative to the optical element 132 (or vice versa) to alter a characteristic of the beam. In some implementations, the optical element 134 may be attached to a movement component, such as a rotation motor or a translation motor, to be moved relative to the optical element 132 (or vice versa). Additionally, or alternatively, the optical elements 132/134 may be mounted on a platform or in a housing that enables manual adjustment. A translation of the optical element 134 relative to the optical element 132 may cause a change to a near field (e.g., by spreading or contracting a near field of each portion of the beam).

Similarly, a rotation of the optical element 134 relative to the optical element 132 may cause a change to the near field (e.g., by converging or diverging the portions of the beam). For example, as shown in FIG. 1A, at a first relative position of the optical elements 132/134, a beam shape at an input to the process cable 150 has three portions of a beam approximately overlapping. In contrast, as shown in FIG. 1B, at a second relative position of the optical elements 132/134 (e.g., a rotation of the optical element 134 relative to an optical axis of the beam), the three portions of the beam are spread toward edges of a field of the beam.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figures 2A, 2B:
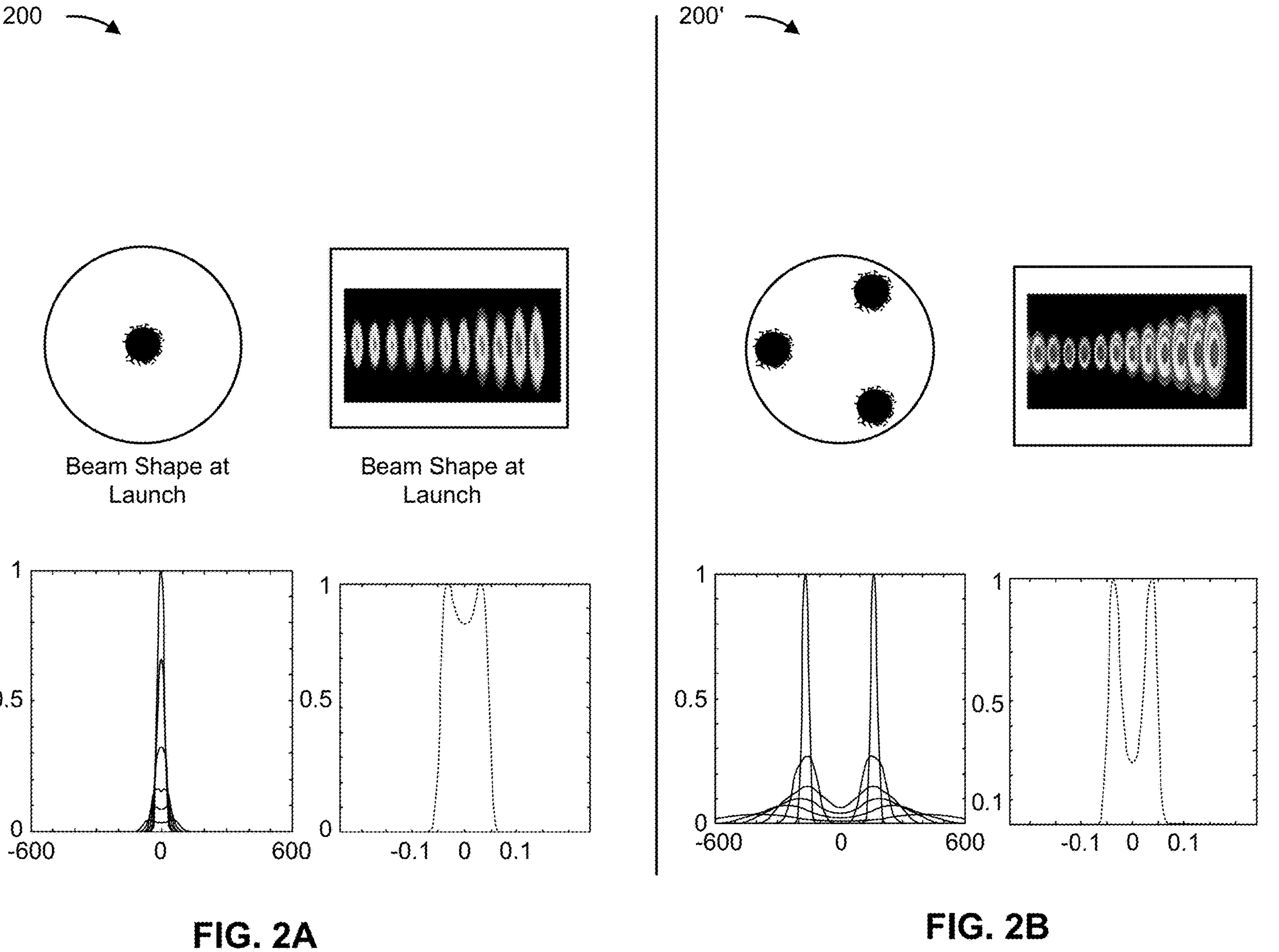
FIGS. 2A-2B are diagrams of an example implementation associated with beam control for optical beams.

FIGS. 2A-2B are diagrams of an example implementation 200 associated with beam control for optical beams. As shown in FIGS. 2A-2B, a beam, which is directed through an optical coupler, such as the optical shaper 130, may have a first beam profile in a near field and a second beam profile in a far field, which may be a point that is external to (or at an end of) a process cable through which the beam propagates. As shown in FIG. 2A, at a first relative position of pyramidal prisms within the optical coupler, the beam may have a point profile in a near field and a first shape in a far field. For example, a beam profile of the first shape may have a beam-parameter-product (BPP) of approximately 1.4 millimeters times milliradians (mm-mrad). In some implementations, the first beam shape may be a point beam shape or a split beam shape in connection with a relative position of optical elements of the optical coupler.

As shown in FIG. 2B, when at least one of the pyramidal prisms is moved relative to another of the pyramidal prisms within the optical coupler, the beam profile is altered to a plurality of points, with angular momentum, in the near field and a second shape (e.g., a vortex profile or an annulus beam) in a far field. For example, a beam profile of the second shape may have a maximum BPP of approximately 12 mm-mrad. In some implementations, the second shape may have a helical structure. For example, the second shape may be an annulus beam shape (e.g., extending along an entire output beam profile) or a vortex mode beam shape. Additionally, or alternatively, the second shape may have a reduced optical power at a center-point (e.g., an axis of travel of the beam) relative to the first shape. Additionally, or alternatively, the second shape may have a greater degree of steepness than the first shape. In other words, a transition between a first optical power level (e.g., a minima) and a second optical power level (e.g., a maximum) may occur over a shorter physical distance across the beam profile in the second shape relative to the first shape.

In this way, use of a pair of pyramidal prisms increases edge steepness of an annulus beam. For example, the pair of pyramidal prisms may achieve a threshold level of edge sharpness. Additionally, or alternatively, the pair of pyramidal prisms results in production of an annulus beam in both a near field and a far field (e.g., production of a vortex beam). Additionally, or alternatively, the pair or pyramidal prisms results in improving dynamic range of a beam parameter product and rotation-based decoupling of beam adjustment (e.g., decoupling of rotation-based beam adjustment from vibrations along the translation axes).

As indicated above, FIGS. 2A-2B are provided as an example. Other examples may differ from what is described with regard to FIGS. 2A-2B.

Figure 3:
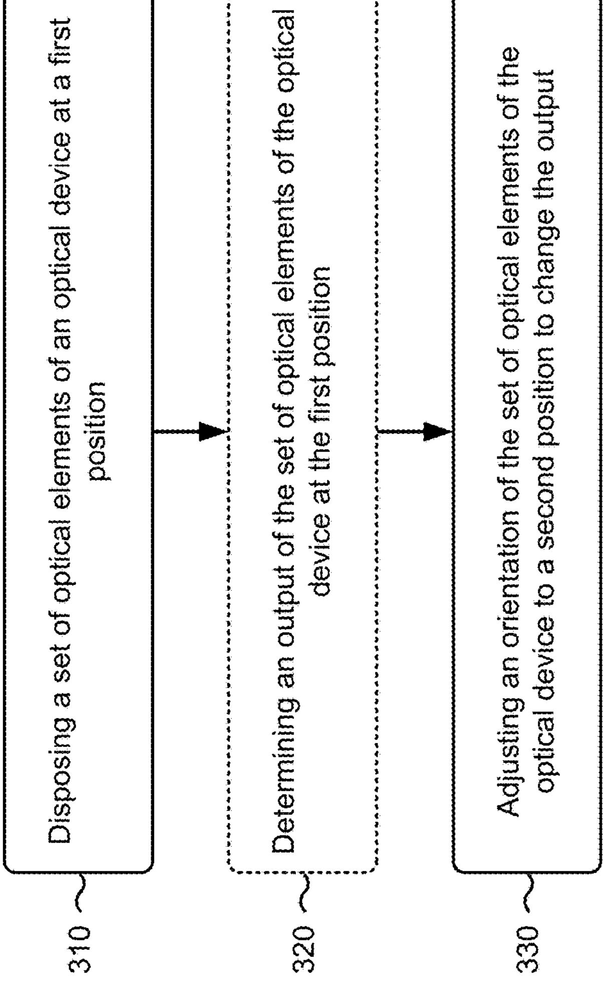
FIG. 3 is a flowchart of an example process associated with beam control for optical beams.

FIG. 3 is a flowchart of an example process 300 associated with beam control for optical beams. In some implementations, one or more process blocks of FIG. 3 are performed by a controller. For example, one or more process blocks of FIG. 3 may be performed by a linear motor (or an electrical controller thereof), a rotational motor (or an electrical controller thereof), an actuation component (e.g., for actuation linearly or rotationally), or another type of control device. In some implementations, one or more process blocks of FIG. 3 are performed by another device or a group of devices separate from or including the controller.

As shown in FIG. 3, process 300 may include disposing a set of optical elements of an optical device at a first position (block 310). For example, the controller may set a relative position of a first optical element and a second optical element within an optical device within an optical system to a first relative position, as described above. In some implementations, the first optical element and the second optical element are a pair of pyramidal prisms. In some implementations, the optical system outputs a beam with a first beam shape with the relative position set to the first relative position, as described above.

As shown in FIG. 3, in some implementations, process 300 may include determining an output of the set of optical elements of the optical device at the first position (block 320). For example, the controller may receive feedback indicating a beam shape of a beam being output from the optical device, as described above. In this case, the controller may determine to change the beam shape. Additionally, or alternatively, the controller may be triggered to change the beam shape without receiving a feedback signal.

As further shown in FIG. 3, process 300 may include adjusting an orientation of the set of optical elements of the optical device to a second position to change the output (block 330). For example, the controller may adjust the relative position of the first optical element and the second optical element within the optical device within the optical system to a second relative position, as described above. In some implementations, the optical system outputs the beam with a second beam shape with the relative position set to the second relative position.

Process 300 may include additional implementations, such as any single implementation or any combination of implementations described below and/or in connection with one or more other processes described elsewhere herein.

In a first implementation, process 300 includes receiving feedback identifying the first beam shape, and wherein adjusting the relative position to the second relative position comprises adjusting the relative position to the second relative position in connection with a control signal associated with the feedback.

In a second implementation, alone or in combination with the first implementation, adjusting the relative position to the second relative position comprises translating or rotating at least one of the first optical element or the second optical element.

In a third implementation, alone or in combination with one or more of the first and second implementations, process 300 includes coupling the optical device to an optical fiber within the optical system.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When a component or one or more components (e.g., a laser emitter or one or more laser emitters) is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical device, comprising:

a first optical element, wherein the first optical element is a first pyramidal prism having three facets and a base; and a second optical element, wherein the second optical element is a second pyramidal prism having three facets and a base, wherein the optical device is configured to receive a beam and output the beam, the first optical element and the second optical element being configured to alter a beam shape of the beam, such that the beam has a first shape at a first location and a second shape at a second location, wherein the optical device is configured to split the beam into a plurality of components at the first location, and wherein at least one of the first optical element or the second optical element is movable to adjust the second shape.

2. The optical device of claim 1, wherein the second shape is an annulus beam shape with a threshold level of edge sharpness.

3. The optical device of claim 1, wherein the at least one of the first optical element or the second optical element is rotatable around an axis of a beam path formed by the beam between the first optical element and the second optical element.

4. The optical device of claim 1, wherein the first optical element is configured to split the beam into the plurality of components at the first location.

5. The optical device of claim 1, wherein the first shape is a hexagonal close-pack field shape.

6. The optical device of claim 1, wherein the second shape is a vortex mode beam shape.

7. An optical system, comprising:

a collimating lens to collimate a beam;

a focusing lens to focus the beam; and an optical device to shape the beam, the optical device being disposed between the collimating lens and the focusing lens, the optical device comprising:

a first pyramidal prism having three facets and a base, and a second pyramidal prism having three facets and a base, the first pyramidal prism and the second pyramidal prism being positioned to cause the beam to have a first beam shape in a near-field and a second beam shape in a far-field, the first pyramidal prism is configured to split the beam into a plurality of components, and at least one of the first pyramidal prism or the second pyramidal prism is movable to cause the second beam shape in the far-field.

8. The optical system of claim 7, further comprising: an optical emitter to emit the beam toward the collimating lens.

9. The optical system of claim 7, further comprising: a process cable to receive the beam from the focusing lens and direct the beam toward a target.

10. The optical system of claim 9, wherein the near-field is at an input of the process cable, and wherein the far-field is at an output of the process cable.

11. The optical system of claim 9, wherein the near-field is at an input of the process cable, and wherein the far-field is at the target external to the process cable and aligned to an output of the process cable.

12. The optical system of claim 9, wherein, at a first relative position of the first pyramidal prism and the second pyramidal prism, the first beam shape is a point beam shape and the second beam shape is an annulus beam shape, and wherein, at a second relative position of the first pyramidal prism and the second pyramidal prism, the first beam shape is a split beam shape and the second beam shape is a vortex mode beam shape.

13. The optical system of claim 9, wherein the optical system is configured to output an annulus beam shape extending along an entire output beam profile.

14. The optical system of claim 9, wherein the optical system is configured to output the beam with an annulus beam shape and an edge steepness of the annulus beam shape that exceeds a threshold edge steepness value.

15. The optical system of claim 9, further comprising: an actuation component configured to move at least one of the first pyramidal prism or the second pyramidal prism linearly with respect to a beam path formed by the beam.

16. The optical system of claim 9, further comprising: an actuation component configured to move at least one of the first pyramidal prism or the second pyramidal prism rotationally around an axis of a beam path formed by the beam.

17. A method, comprising:

setting, by a controller, a relative position of a first optical element and a second optical element within an optical device within an optical system to a first relative position, wherein the first optical element and the second optical element are a pair of pyramidal prisms each having three facets and a base, wherein the optical system outputs a beam with a first beam shape with the relative position set to the first relative position, wherein the optical device is configured to receive the beam and output the beam, the first optical element and the second optical element being configured to alter a beam shape of the beam, such that the beam has the first beam shape at a first location and a second beam shape at a second location, wherein the first optical element is configured to split the beam into a plurality of components at the first location, and wherein at least one of the first optical element or the second optical element is movable to adjust the second beam shape; and adjusting, by the controller, the relative position of the first optical element and the second optical element within the optical device within the optical system to a second relative position, wherein the optical system outputs the beam with the second beam shape with the relative position set to the second relative position.

18. The method of claim 17, further comprising: receiving feedback identifying the first beam shape; and wherein adjusting the relative position to the second relative position comprises:

adjusting the relative position to the second relative position in connection with a control signal associated with the feedback.

19. The method of claim 17, wherein adjusting the relative position to the second relative position comprises:

translating or rotating at least one of the first optical element or the second optical element.

20. The method of claim 17, further comprising: coupling the optical device to an optical fiber within the optical system.

* * * * *